United States Patent
Hipp

(10) Patent No.: US 6,848,106 B1
(45) Date of Patent: Jan. 25, 2005

(54) SNAPSHOT RESTORE OF APPLICATION CHAINS AND APPLICATIONS

(75) Inventor: Burton A. Hipp, Elk Grove, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 499 days.

(21) Appl. No.: 09/680,847

(22) Filed: Oct. 5, 2000

Related U.S. Application Data

(60) Provisional application No. 60/157,728, filed on Oct. 5, 1999, provisional application No. 60/157,729, filed on Oct. 5, 1999, provisional application No. 60/157,833, filed on Oct. 5, 1999, provisional application No. 60/157,727, filed on Oct. 5, 1999, and provisional application No. 60/157,834, filed on Oct. 5, 1999.

(51) Int. Cl.[7] ................................................. G06F 3/00
(52) U.S. Cl. ........................... 719/312; 718/1; 718/100; 718/104; 709/213; 709/214; 709/226
(58) Field of Search .......................... 719/312; 709/213, 709/214, 226, 310–340; 218/1, 100, 104

(56) References Cited

U.S. PATENT DOCUMENTS

| | | |
|---|---|---|
| 5,067,072 A | 11/1991 | Talati et al. |
| 5,088,031 A | 2/1992 | Takasaki et al. |
| 5,109,510 A | 4/1992 | Baker et al. |
| 5,365,606 A | 11/1994 | Brocker et al. |
| 5,403,639 A * | 4/1995 | Belsan et al. ............... 707/204 |
| 5,530,795 A | 6/1996 | Wan |
| 5,608,720 A * | 3/1997 | Biegel et al. ............... 370/249 |
| 5,649,152 A | 7/1997 | Ohran et al. |
| 5,678,042 A | 10/1997 | Pisello et al. |
| 5,734,865 A | 3/1998 | Yu |
| 5,758,355 A | 5/1998 | Buchanan |
| 5,790,114 A | 8/1998 | Geaghan et al. |
| 5,822,523 A | 10/1998 | Rothschild et al. |
| 5,889,945 A | 3/1999 | Porter et al. |
| 5,896,500 A | 4/1999 | Ludwig et al. |
| 6,131,148 A | 10/2000 | West et al. |
| 6,173,332 B1 | 1/2001 | Hickman |
| 6,205,450 B1 | 3/2001 | Kanome |
| 6,212,531 B1 | 4/2001 | Blea et al. |
| 6,269,431 B1 | 7/2001 | Dunham |
| 6,324,690 B1 * | 11/2001 | Luu ........................... 717/177 |
| 6,363,421 B2 * | 3/2002 | Barker et al. ............... 709/223 |
| 6,385,613 B1 | 5/2002 | Grewell et al. |
| 6,442,663 B1 * | 8/2002 | Sun et al. ................... 711/202 |
| 6,567,849 B2 | 5/2003 | Ludovici et al. |

* cited by examiner

Primary Examiner—Nabil El-Hady
(74) Attorney, Agent, or Firm—Lawrence J. Merkel; Meyertons, Hood, Kivlin, Kowert & Goetzel, P.C.

(57) ABSTRACT

The present invention saves all process state, memory, and dependencies related to a software application to a snapshot image. Interprocess communication (IPC) mechanisms such as shared memory and semaphores must be preserved in the snapshot image as well. IPC mechanisms include any resource that is shared between two process or any communication mechanism or channel that allow two processes to communicate or interoperate is a form of IPC. Between snapshots, memory deltas are flushed to the snapshot image, so that only the modified-pages need be updated. Software modules are included to track usage of resources and their corresponding handles. At snapshot time, state is saved by querying the operating system kernel, the application snapshot/restore framework components, and the process management subsystem that allows applications to retrieve internal process-specific information not available through existing system calls. At restore time, the reverse sequence of steps for the snapshot procedure is followed and state is restored by making requests to the kernel, the application snapshot/restore framework, and the process management subsystem.

25 Claims, 15 Drawing Sheets

SNAPSHOT RESTORE OF APPLICATION CHAINS AND APPLICATIONS

REFERENCE TO RELATED APPLICATIONS

The present application claims priority to and incorporates the following applications by reference: DYNAMIC SYMBOLIC LINK RESOLUTION, Prov. No. 60/157,728, filed on Oct. 5, 1999; SNAPSHOT VIRTUAL TEMPLATING, Prov. No. 60/157,729, filed on Oct. 5, 1999; SNAPSHOT RESTORE OF APPLICATION CHAINS AND APPLICATIONS, Prov. No. 60/157,833, filed Oct. 5, 1999; VIRTUAL RESOURCE-ID MAPPING, Prov. No. 60/157,727, filed on Oct. 5, 1999; and VIRTUAL PORT MULTIPLEXING, Prov. No. 60/157,834 filed on Oct. 5, 1999.

FIELD OF THE INVENTION

The present invention relates broadly to computer networks. Specifically, the present invention relates to adaptively scheduling applications on-demand onto computers in a computer network. More specifically, the present invention relates to making a snapshot image of a running application including data and state information, and restoring a running application from the snapshot image.

BACKGROUND

Global computer networks such as the Internet have allowed electronic commerce ("e-commerce") to flourish to a point where a large number of customers purchase goods and services over websites operated by online merchants. Because the Internet provides an effective medium to reach this large customer base, online merchants who are new to the e-commerce marketplace are often flooded with high customer traffic from the moment their websites are rolled out. In order to effectively serve customers, online merchants are charged with the same responsibility as conventional merchants: they must provide quality service to customers in a timely manner. Often, insufficient computing resources are the cause of a processing bottleneck that results in customer frustration and loss of sales. This phenomena has resulted in the need for a new utility: leasable on-demand computing infrastructure. Previous attempts at providing computing resources have entailed leasing large blocks of storage and processing power. However, for a new online merchant having no baseline from which to judge customer traffic upon rollout, this approach is inefficient. Either too much computing resources are leased, depriving a start up merchant of financial resources that are needed elsewhere in the operation, or not enough resources are leased, and a bottleneck occurs.

To make an on-demand computer infrastructure possible, computer applications must be ported across computer networks to different processing locations. However, this approach is costly in terms of overhead for the applications to be moved across the network must be saved, shut down, stored, ported and then restored and re-initialized with the previously running data. The overhead is prohibitive and negates any performance improvements realized by transferring the application to another computer. Thus, there remains a heartfelt need for a system and method for effecting a transfer of applications across computer networks without incurring costly processing overhead.

SUMMARY OF THE INVENTION

The present invention solves the problems described above by saving all process state, memory, and dependencies related to a software application to a snapshot image. Interprocess communication (IPC) mechanisms such as shared memory and semaphores must be preserved in the snapshot image as well. IPC mechanisms include any resource that is shared between two process or any communication mechanism or channel that allow two processes to communicate or interoperate is a form of IPC. Sockets, shared memory, semaphores and pipes are some examples of IPC mechanisms. Between snapshots, memory deltas are flushed to the snapshot image, so that only the modified-pages need be updated. Software modules that track usage of resources and their corresponding handles are included as part of the snapshot/restore framework of the present invention. At snapshot time, state is saved by querying the operating system kernel, the application snapshot/restore framework components, and the process management subsystem that allows applications to retrieve internal process-specific information not available through existing system calls. At restore time, the reverse sequence of steps for the snapshot procedure is followed and state is restored by making requests to the kernel, the application snapshot/restore framework, and the process management subsystem.

These and many other attendant advantages of the present invention will be understood upon reading the following detailed description in conjunction with the drawings.

DETAILED DESCRIPTION

A. Snapshot Restore

Figure 1:
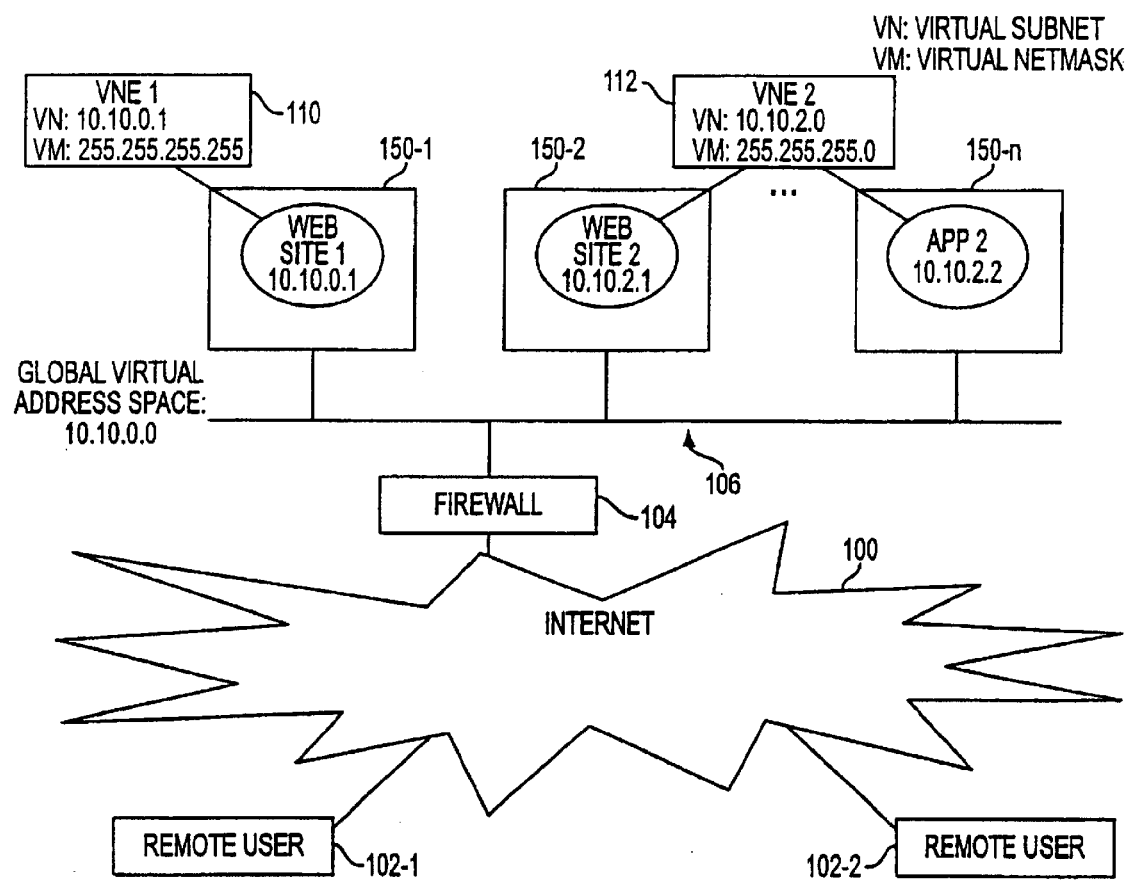
FIG. 1 is a high level block diagram illustrating the various components of a computer network used in connection with the present invention.

FIG. 1 illustrates in high level block diagram form the overall structure of the present invention as used in connection with a global computer network 100 such as the Internet. Remote users 102-1 and 102-2 can connect through the computer network 100 to a private network of computers 106 protected by firewall 104. Computer network 106 is a network comprising computers 150-1, 150-2, through 150-n, where n is the total number of computers in network 106. Computers 150 are used to run various applications, as well as host web sites for access by remote users 102. The present invention is implemented on computer network 106 in the form of virtual environments 110-1 and 110-2. While only two virtual environments are illustrated, it is to be understood that any number of virtual environments may be utilized in connection with the present invention.

Figure 2:
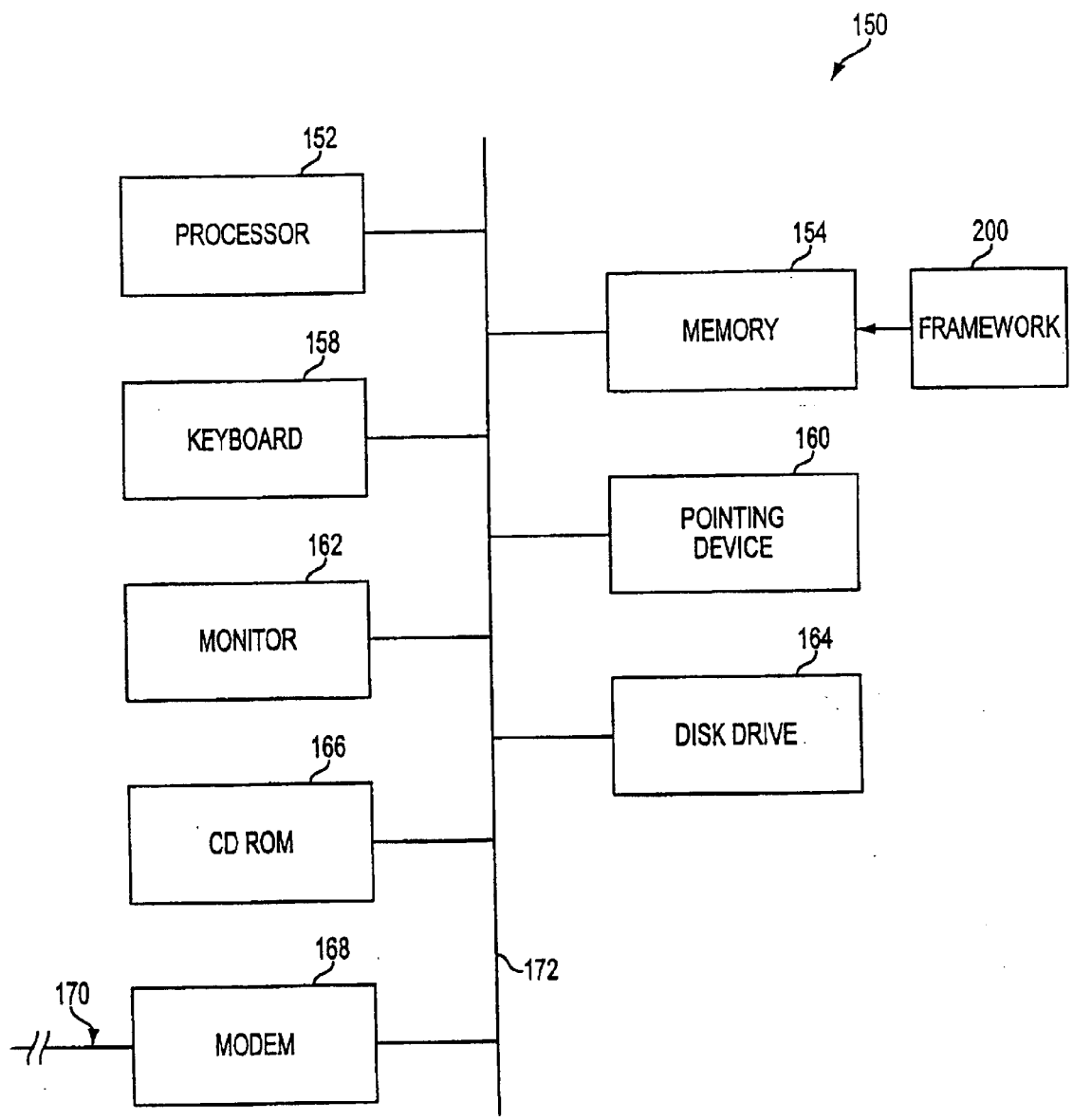
FIG. 2 is a high level block diagram illustrating the various components of a computer used in connection with the present invention.

FIG. 2 illustrates in high level block diagram form a computer that may be utilized in connection with the present invention. Computer 150 incorporates a processor 152 utilizing a central processing unit (CPU) and supporting integrated circuitry. Memory 154 may include RAM and NVRAM such as flash memory, to facilitate storage of software modules executed by processor 152, such as application snapshot/restore framework 200. Also included in computer 150 are keyboard 158, pointing device 160, and monitor 162, which allow a user to interact with computer 150 during execution of software programs. Mass storage devices such as disk drive 164 and CD ROM 166 may also be in computer 150 to provide storage for computer programs and associated files. Computer 150 may communicate with other computers via modem 168 and telephone line 170 to allow the computer 150 to be operated remotely, or utilize files stored at different locations. Other media may also be used in place of modem 168 and telephone line 170, such as a direct connection or high speed data line. The components described above may be operatively connected by a communications bus 172.

Figure 3:
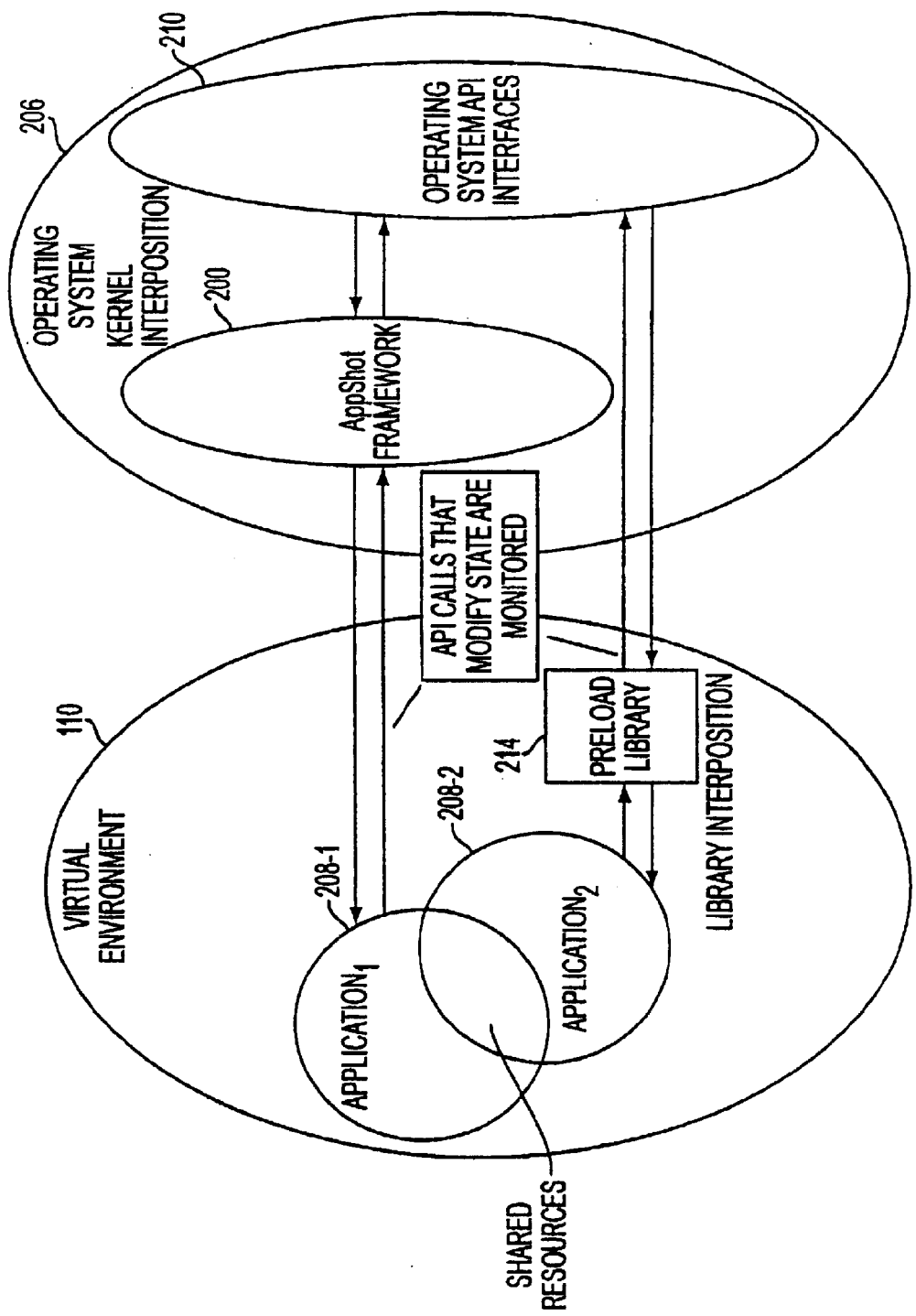
FIG. 3 illustrates how application state is tracked using library and operating system kernel interposition.

FIG. 3 shows how application states are tracked via library and kernel interposition. The application snapshot/restore framework 200 is a software module that processes transactions between the operating system 206 and the applications 208. Requests for system resources or changes to process state are routed internally and the application snapshot/restore framework 200 tracks these events in anticipation of a snapshot. The application snapshot/restore framework 200 is transparent to running (and snapshotted) applications. From an application's perspective, the application is always running. An application snapshot may consist of multiple processes and multiple threads and includes shared resources in use by a process, such as shared memory or semaphores. A process may be snapshotted & restored more than once. The computer on which a process is restored on must be identically configured and have an identical environment (hardware, software, and files) that matches the environment of the computer where the process was snapshotted. All processes that are snapshotted together in the form of an application chain share the same application ID ("AID"). As used herein, an application chain is the logical grouping of a set of applications and processes that communicate with each other and share resources to provide a common function.

The virtual environment 110 is a layer that surrounds application(s) 208 and resides between the application and the operating system 206. Resource handles are abstracted to present a consistent view to the application although the actual system resource handles may change as an application is snapshot/restored more than once. The virtual environment also allows multiple applications to compete for the same resources where exclusion would normally prohibit such behavior to allow multiple snapshots to coexist without reconfiguration. Preload library 214 is an application library that interposes upon an application for the express purpose of intercepting and handling library calls and system calls. Once the library has been preloaded it is attached to the process' address space. Preload library 214 interposes between application 208 and operating system 206. It is distinguished from kernel interposition in that it operates in "user mode" (i.e., non-kernel and non-privileged mode). Application 208 can make application programming interface (API) calls that modify the state of the application. These calls are made from the application 208 to the operating system API interfaces 210 via the application snapshot restore framework 200 or the preload library 214. The preload library can save the state of various resources by intercepting API interface calls and then saves the state at a pre-arranged memory location. When the process' memory is saved as part of the snapshot/restore mechanism, this state is saved since it resides in memory. The state as it is modified is saved to non-volatile storage (i.e. a file on disk). The preload library notify the snapshot/restore framework through one of its private interface.

Figure 4:
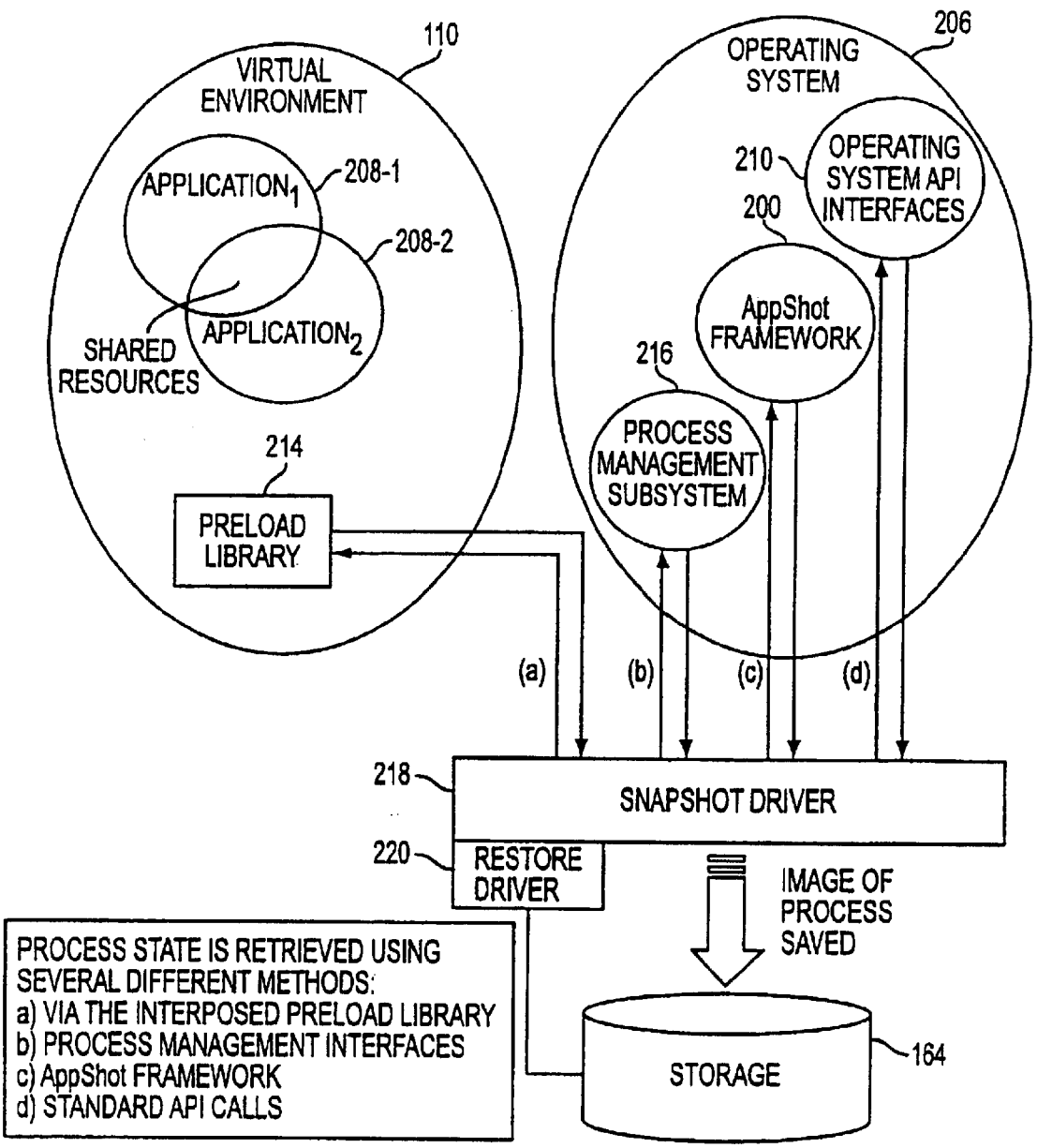
FIG. 4 illustrates the capture of an application's run-time state.

FIG. 4 illustrates the capture of an application's run time state. The OS API interfaces 210 are standard programming interfaces defined by international standards organizations such as XOPEN. The open( ) system call which allows an application to open a file for reading is an example of an API interface. The process management system 216 is a component of the operating system 206 that allows one process to examine or alter the state of another process. The interfaces that are provided by this component are usually not standardized interfaces (not part of a recognized standard API) and are OS-implementation dependent. However, such interfaces usually allow access to more state than standardized API interfaces. The run-time information captured from a process is used by the snapshot driver 218.

An application needs to be snapshotted if it is idle and is not currently in use or there are higher priority requests that require the application be scheduled out and preempted in favor of another application. A snapshot request is initiated by an application scheduler that determines when an application needs to be restored on-demand and when the application is no longer needed (can be snapshotted to free up resources). The application scheduler does this based on web traffic, server load, request response time, and a number of other factors. An application needs to be restored if there is an incoming request (i.e. a web browser request) and the application required to handle that request (ie a particular web site) is not currently running. Alternatively, an application needs to be restored if there is an incoming request (i.e. a web browser request) and the application required to handle that request (ie a particular web site) is currently overloaded, so another instance of that application is restored to handle that request.

Figure 5:
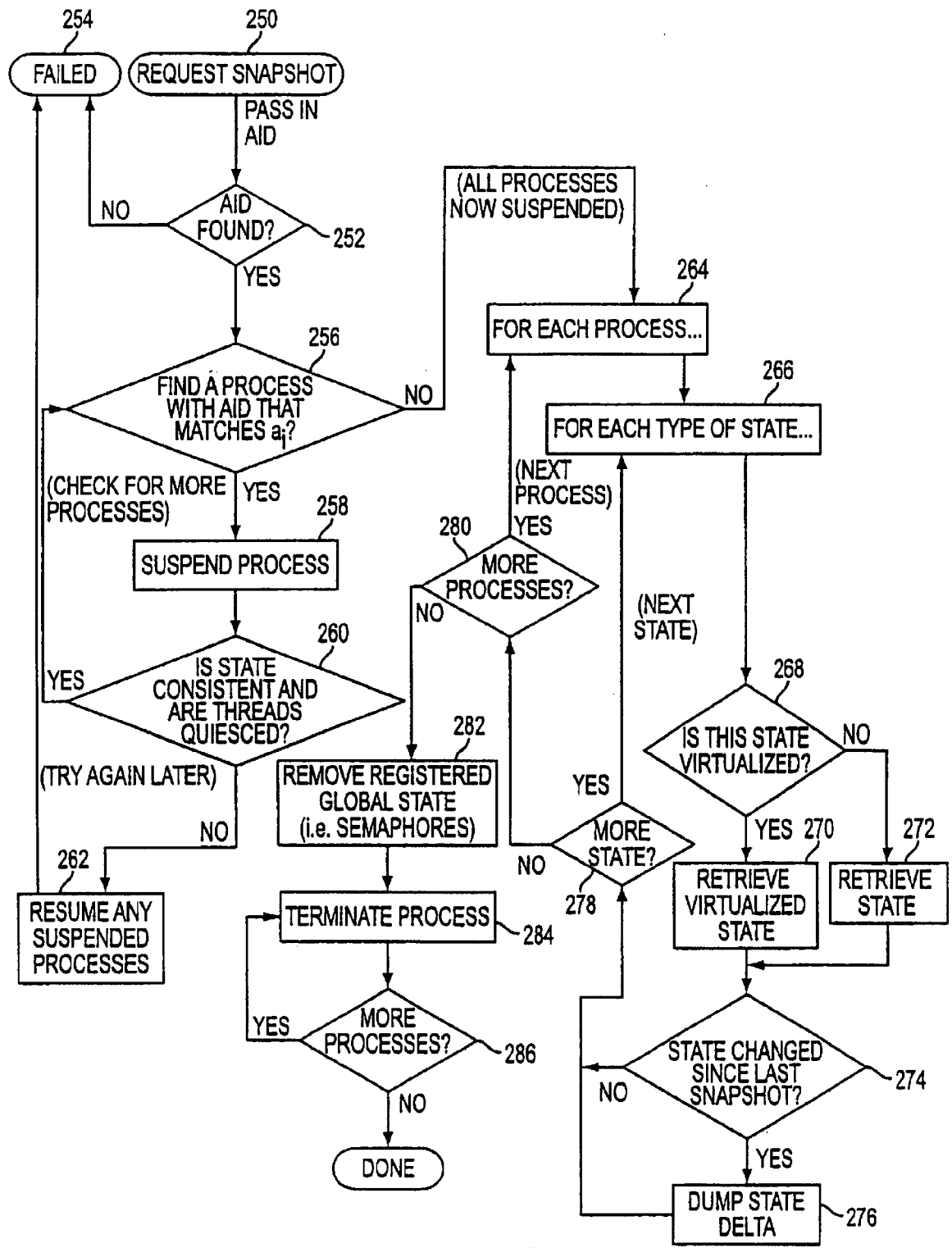
FIG. 5 is a flow chart illustrating the logical sequence of steps executed to create a snapshot image of an application instance.

FIG. 5 illustrates the logical sequence of steps executed by Snapshot driver 218 to make a snapshot image of a process. Beginning at step 250, an snapshot image of a runnable application is requested. The AID is looked up (decision step 252) in a table in memory 154 containing a list of every AID present on computer 150. If the AID is not found control returns at step 254. However, if the AID is found, control continues to decision step 256 where the snapshot/restore framework 200 searches for a process belonging to the application having the matched AID. If a process is found, control continues to step 258, where the process is suspended. For a process to be snapshotted, it must be completely suspended with no activity present and no ambiguous state (i.e., in a transitory state). Since a process may be represented by asynchronous threads of activity in the operating system that are not formally part of the process state, any activity in the operating system that is executing on behalf of the process must be stopped (i.e. disk I/O activity). In other words, there may be moments where temporarily a process cannot be snapshotted. This is a finite and short period of time, but it can occur. If the state is consistent and the threads are quiesced (decision step 260), control loops to step 256 and the remaining processes belonging to the application are located and suspended. However, if a process is located that does not have a consistent state or a thread is not quiesced, suspended processes are resumed and the snapshot cannot be completed.

Once all related processes are suspended, for each state (step 266) of each suspended process (step 264), the state is checked to see if it is virtualized (step 268). A virtualized state is any process state that reflects a virtualized resource. If the state is virtualized, it is retrieved at step 270; otherwise the non-virtualized state is retrieved at step 272. State retrieval is performed as described above by the snapshot driver 218 querying the application snapshot/restore framework 200, operating system API interfaces 210, and process management subsystem 216. If the state has changed since the last snapshot (step 274), the new state is recorded (step 276). Control then loops to step 264 (through decision steps 278 and 280) and executes through the above sequence of steps until all states of all processes are checked. Once completed, control proceeds to step 282 (through decision steps 278 and 280), the registered global state, such as semaphores, is removed. Registered global state is state that is not specifically associated with any one process (ie private state). Global state is usually exported (accessible) to all processes and its state can be modified (shared) by all processes. Control proceeds to step 284, where the process is terminated. If there are remaining processes (step 286), these are also terminated. This sequence of steps is concluded to create a snapshot image which is stored as a file and made available for transmission to another computer within public computer network 100 or private computer network 106.

Figure 6:
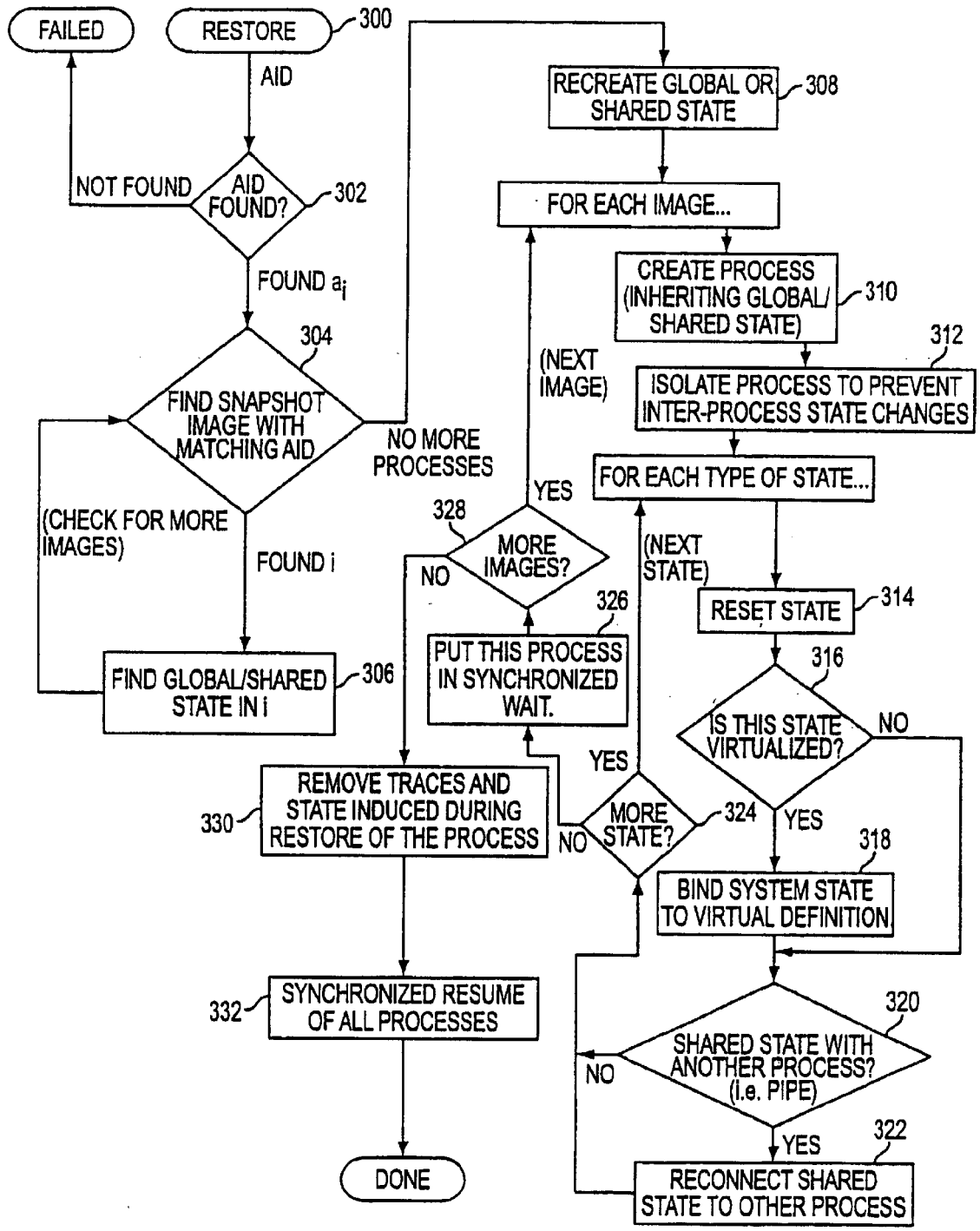
FIG. 6 is a flow chart illustrating the logical sequence of steps executed to restore an application instance from a snapshot image.

FIG. 6 illustrates the sequence of steps executed by the restore driver 220 to restore a snapshot image. The snapshot image is accessed via a shared storage mechanism and a restore call is made at step 300. The restore driver 220 looks up the AID for the snapshot image and (decision step 302) if not found control returns and the snapshot image cannot be restored. However, if the AID is found, control continues to decision step 304 where, if the snapshotted image matching the AID is located, the global/shared state for each process associated with the snapshot are found. Control then continues to step 308, where remaining global or shared state for the processes are recreated. Since global and shared state is not associated with a single process and may be referenced by multiple processes, it is created first. Recreating the state entails creating a global resource that is functionally identical to the resource at the time of the snapshot. For example if during a snapshot, a semaphore with id 5193 is found with a value of 7, then to recreate the state at restore time a new semaphore must be created having the exact same ID as before (ie 5193) and it also must have the same state (ie value 7) as before. Then, for each image, a process is created that inherits the global/shared state restored in step 308, and each created process is isolated to prevent inter-process state changes. When a process is being restored, process state is being registered with the kernel, inter-process mechanisms are being restored and reconnected and I/O buffers in the kernel may be being restored. Some of these actions in one process may have the unintended side effect of disturbing another process that is also being restored. For example if an I/O buffer that is in the operating system as a result of a process, performing a write to a socket connection, then process$_y$ could unintentionally be delivered an asynchronous signal that notifies it of I/O being present (for reading) prior to the process being fully restored. At step 314, for each type of state within the processes, the process-private resources are recreated to their state at the time the snapshot image was taken. If the state is virtualized (decision step 316), the system state is bound to a virtual definition. As part of the restore an extra step must be done to create a virtual mapping. This is done by taking the system resource that was created in step 314 and binding it to the virtual definition that was saved during the snapshot in step 266. This allows the application to see a consistent view of resources, since it cannot be guaranteed that at restore time the exact same system resource will be available. If the state is shared with another process, such as via a pipe (decision state 320), the shared state is reconnected with the other process at step 322. If there are more states (decision step 324) steps 314 through 322 are repeated. Once steps 314 through 322 have been executed for all states, control continues to step 326, where the process is placed in synchronized wait. If there are remaining images in the snapshot image (decision step 328), steps 310 through 326 are repeated. Once all images have been processed, control continues to step 330, where traces and states induced during restore of the process are removed, and a synchronized resume of all processes occurs at step 332.

Once steps 300 through 332 have executed without error on whatever computer the restore driver 220 was executed, the restored application can continue to run without interruption. Thus, the present invention avoids the overhead and delay of shutting down an application, storing data to a separate file, moving both the application and data file elsewhere, and restarting the program.

B. Snapshot Virtual Templating

In another aspect, the present invention provides a system, method, and computer program product for creating snapshot virtual application templates for the purpose of propagating a single application snapshot into multiple distinct instances. Snapshot virtual templates allow multiple application instances to use the same fixed resource ID ("RID") by making the resource ID virtual, privatizing the virtual RID, and dynamically mapping it to a unique system resource ID. A RID is the identifier assigned to represent a specific system resource and acts as a handle when referencing that system resource. Anonymous resources are resources that are read-only or functionally isolated from other applications. Anonymous resources are also shareable resources. An anonymous resource is a non-fixed resource allocated by the operating system and identified by a per-process handle. These are functionally-isolated since the operating system allocates it anonymously and one is as good as another. Examples of this are non-fixed TCP ports or file descriptors. A resource is said to be network-wide unique if there can only be one instance of that resource with its corresponding identifier on computer network or subnetwork. An example of this is an network IP address (i.e. 10.1.1.1). Snapshot virtual templates allow snapshots to be described in a manner that separates shareable data from non-shareable data. Data is loosely defined to mean any system resource (memory, files, sockets, handles, etc.). When a snapshot is cloned from a virtual template, the common or shared data is used exactly as is, whereas the non-shareable data is either copied-on-write, multiplexed, virtualized, or customized-on-duplication. The present invention greatly reduces the required administrative setup per application instance. Snapshot virtual templating works by noting access to modified resources, fixed system IDs/ keys and unique process-related identifies and automatically inserting a level of abstraction between these resources and the application. The resources contained in a snapshot virtual template can be dynamically redirected at restore time. Access to memory and storage is managed in a copy-on-write fashion. System resource handles are managed in a virtualize-on-allocate fashion or by a multiplex-on-access mechanism. Process-unique resources are managed in a redirect-on-duplicate fashion. Rules may be defined through an application configurator that allows some degree of control over the creation of non-shareable data.

The application configurator is a software component that resides in the application domain and communicates configuration information about the application on its behalf such as the DSL specifications. Since this component operates without assistance from the application, it may exist in the form of an application library, or may be placed in the applications environment (via inheritance at execution time), ir it can be implemented as a server process that proxies application information to the operating system as necessary.

A resource duplicator is a software component that fields requests for non-shareable resources and duplicates or virtualizes resources so that applications receive their own private copies and can co-exist transparently with multiple instances of the same application forged from the same virtual template. The resource duplicator also processes duplication rules fed by the application configurator or application snapshot/restore framework 200.

As used herein, non-shareable data refers to any resource that is modified and globally visible to other application instances is as non-shareable (i.e. files). Process-related identifiers that are system-wide unique are also non-shareable since conflicts will arise if two instances use the same identifier at the same time (uniqueness is no longer preserved). References to unique resources by fixed handles (i.e. fixed TCP port numbers or IPC keys) are also not shareable. Memory pages that are specific to an application instance (i.e. the stack) are another example of a non-shareable resource. For illustrative purposes, examples of non-shareable data include application config files that must be different per application instance as well as modified application data files if the application is not written to run multiple copies simultaneously. Other examples include stack memory segments or heap segments may also be non-shareable data, shared memory keys that are a fixed value, usage of fixed well-known (to the application) TCP port numbers, and process identifiers (two distinct processes cannot share the same PID).

The snapshot virtual template is constructed automatically by dividing a snapshot process into shareable and non-shareable data. The knowledge of which system resources can be shared is encoded in the snapshot virtual templating framework itself. If an application has non-shareable internal resources (as opposed to system resources), it may not be possible to construct a virtual-template for that application.

Snapshot virtual templates are node-independent as well as application-instance dependent. Snapshot virtual templates cannot be created for applications that use non-shareable physical devices. Snapshot virtual templates must save references to non-shareable resources in their pre-customized form, rather than their evaluated form. All access by an application to non-shareable resources must be via the operating system. Internal or implicit dependencies by the application itself cannot be virtually-templated. A snapshot virtual template may be created from an application instance that was originally forged from a different virtual template.

Snapshot virtual templating is an alternate method of creating an application instance. The snapshot restore method described above requires creating unique instances of an application to create unique "snapshots" of that application. Virtual templating allows the creation of a generic application instance from which unique instances may be spawned. Every unique instance that is created from the original virtual template starts out as an exact copy (referred to herein as "clone") but has been personalized just enough to make it a fully-functioning independent copy. Differences between copies may be due to the way resources are named or identified.

Figure 7:
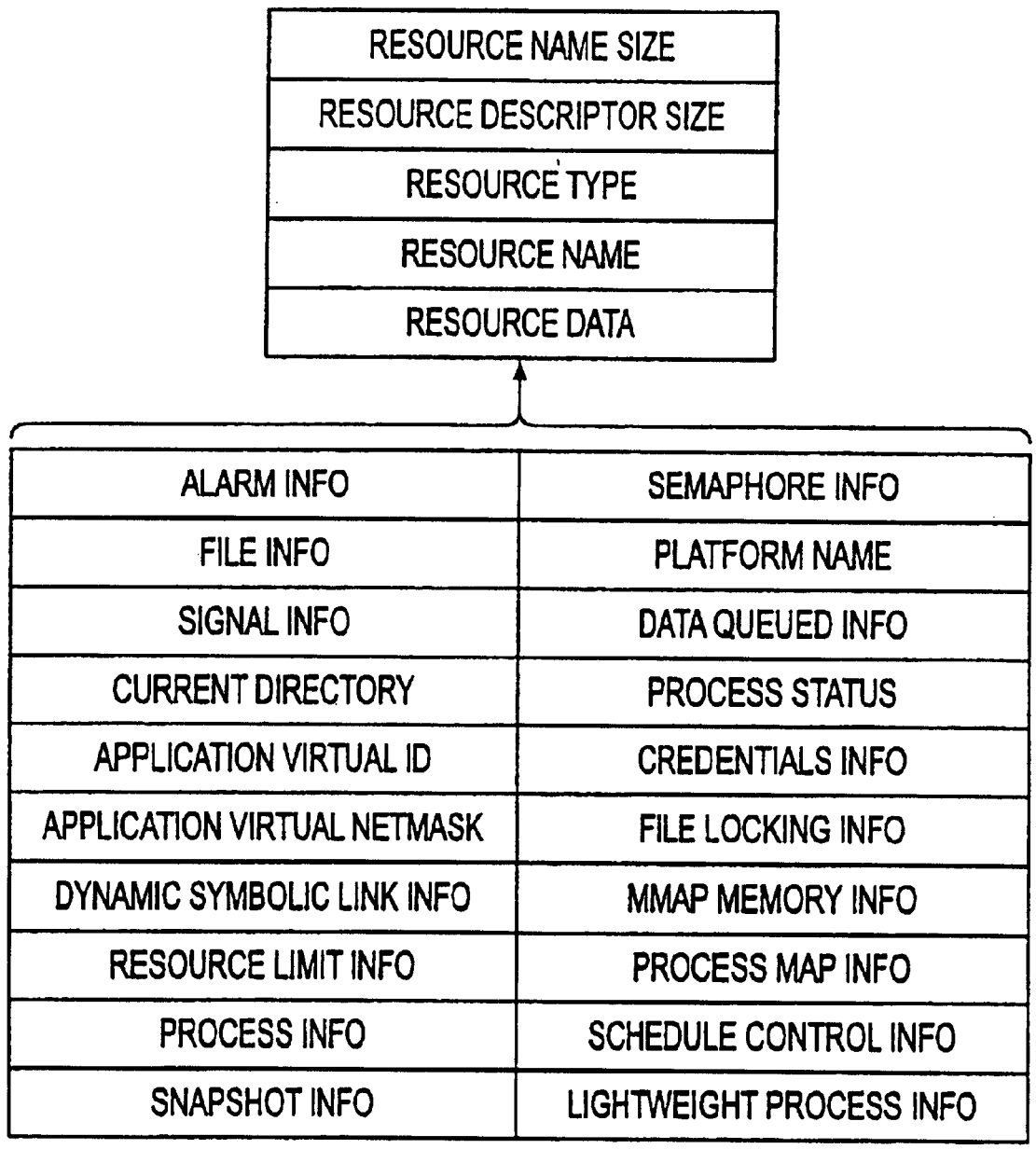
FIG. 7 is an illustration of the format of a snapshot virtual template.

FIG. 7 illustrates in block diagram form the contents of a snapshot virtual template. The main components are resource name size, resource descriptor size, resource type, resource name, and resource data. Resource data includes many different types of information, as illustrated.

Figure 8:
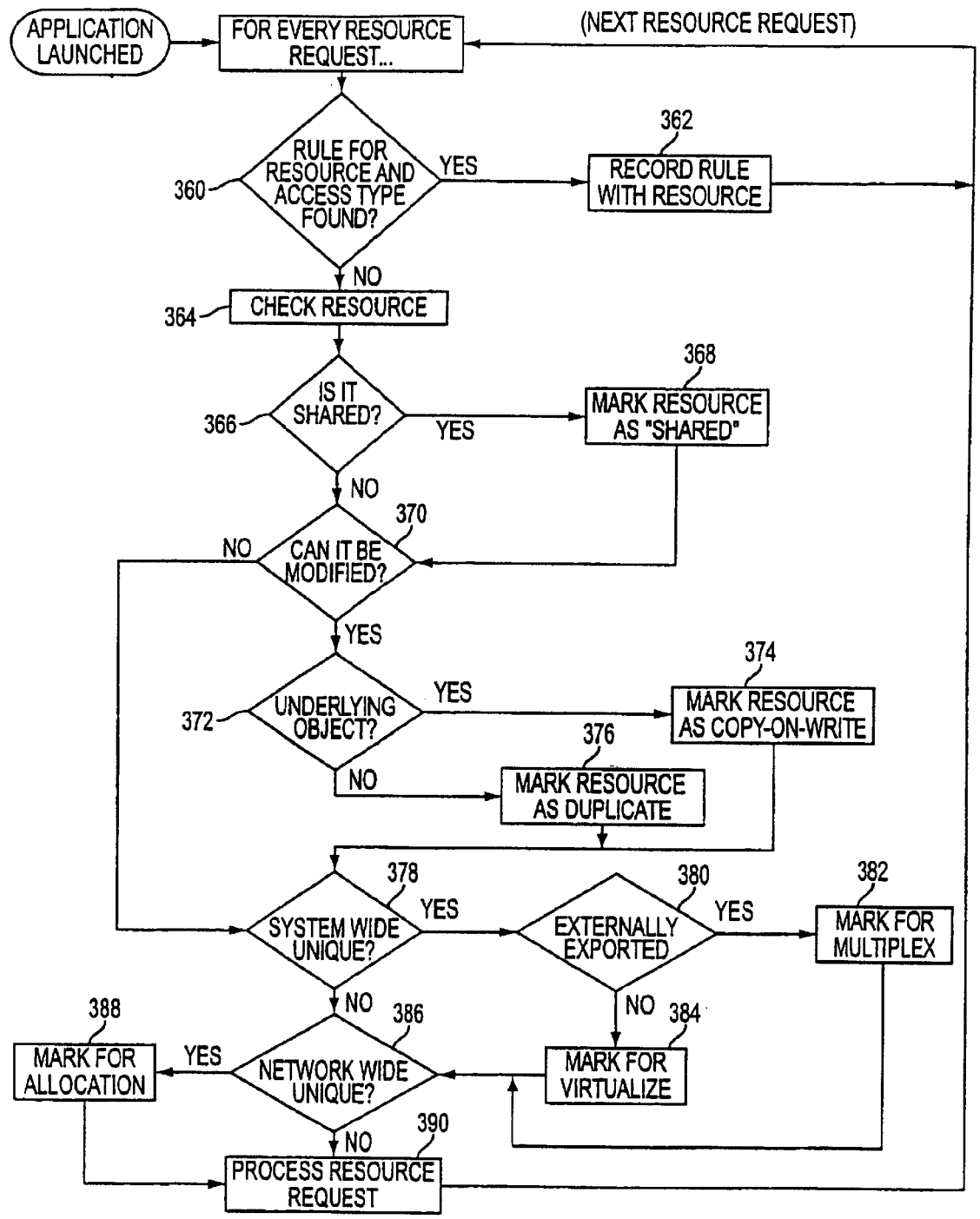
FIG. 8 is a flowchart illustrating the logical sequence of steps executed to create a snapshot virtual template.

FIG. 8 describes the sequence of steps executed by the application snapshot/restore framework 200 to create a snapshot virtual template. As the application runs, every request for a new operating system resource (file, memory, semaphore, etc.) is checked for an existing rule. When the application is started under the virtual templating framework, a set of rules may be supplied at that time. The rule will state the type of resource, the type of access (i.e., create, read, write, destroy, etc), and the action to be taken. If a rule is found (decision step 360), the rule is saved as part of the process state and recorded with the resource as auxiliary state at step 362. Rules may be added to the template that control the creation of application-instance specific resources. For example, environment variables or pathnames that incorporate an AID to differentiate and customize a particular resource among multiple instances. The following syntax created for illustration purposes:

Define <APPL-ID> as PROPERTY application-ID

REDIR PATH "/user/app/config" to "/usr/app/<APPL-ID>/config"

SET ENV "HOME"="/usr/app/<APPL-ID>"

If rules are created, they should also be specified via the application configurator. If no rule is found, the resource is checked using a standard set of criteria that determine whether the resource needs to be abstracted or virtualized in order to be cloned at step 364. The criteria is again checked at steps 366, 370, 372, 378, 380 and 386. In most cases, no action is taken. Resources are simply classified into their correct types so that when an instance is cloned the correct action can be taken. If the resource is shared, i.e. shared memory (decision step 366), the resource is marked as shared (step 368) so that during the subsequent snapshot all references to the shared object will be noted. If the resource can be modified (decision step 370), it must be isolated from the original during cloning so that the original remains untouched. If the resource is a large object and has a notion of an underlying object, such as i.e. mapped memory (decision step 372), it is marked for copy-on-write (step 374). Otherwise, the entire resource must be duplicated and marked accordingly (step 376). A resource is said to be systemwide unique if the identifier used to represent that resource cannot represent more than one instance of that resource at a single point in time on the same node or computer. If the resource is systemwide unique (decision step 378), and is exported as an external interface, as is the case when another client application that is not running on the platform has a dependency on the resource, such as a TCP port number (decision step 380), it isn't feasible to virtualize access to the resource, so it is marked to be multiplexed (step 382). Multiplexing allows multiple independent connections to transparently co-exist over the same transport using only a single identifiable resource. If it isn't externally exported, the resource is marked for virtualize at step 384. Continuing to decision step 386, if the resource is network-unique, it is marked for allocation at step 388. Control proceeds to step 390, where the resource request is processed. Steps 360 through 390 are repeated for every resource request occurring during application execution.

Figure 9:
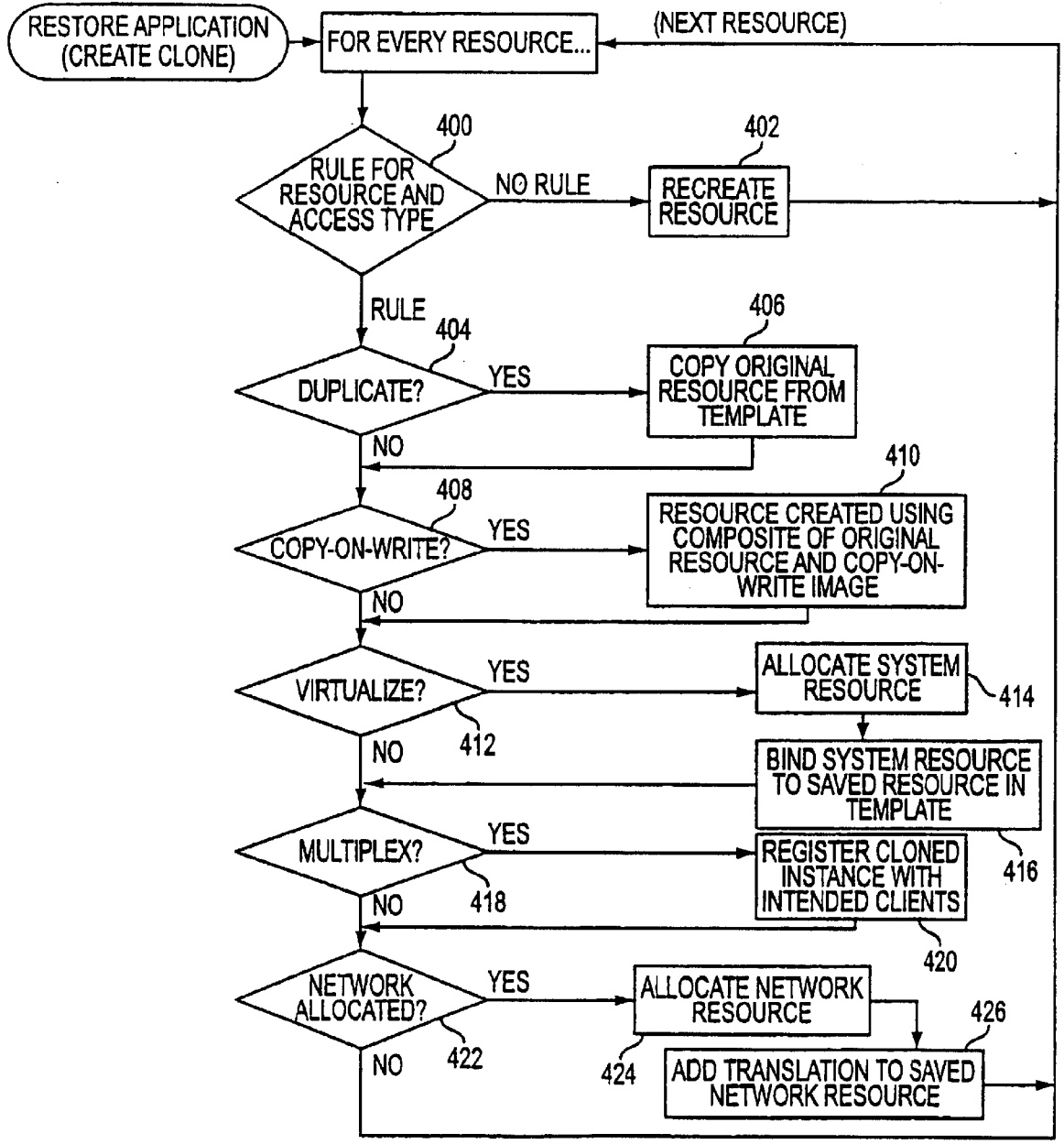
FIG. 9 is a flowchart illustrating the logical sequence of steps executed to clone a snapshot virtual template.

FIG. 9 illustrates the sequence of steps executed to perform cloning or replication of a process from a snapshot virtual template. This sequence of steps can be performed by a replication program that creates a new snapshot image from an existing template, or by the restore driver 220. When an application instance is restored from a snapshot that is a virtual template, a new instance is automatically cloned from the template using the rules that were gathered during the creation of the template. For every resource included in the snapshot virtual template, rules for the resource and access type are looked up. Any resource that requires special handling as part of the templating effort has the rule described inside the snapshot template as part of the auxiliary state associated with the resource. If no rule is found (decision step 400), the resource is recreated using the existing saved information in the snapshot (step 402). Otherwise, if a resource is marked for duplicate (decision step 404), then a copy of the original resource is made at step 406. If a resource is marked for copy-on-write (decision step 408), then at step 410 a reference to the original underlying object (in the original template) is kept, and any modifications to the original force a copy-on-write action so that the modifications are kept in an application-instance private location and the two form a composite view that is visible to the application instance.

If a resource is marked for virtualization (decision step 412), the original resource is allocated or duplicated in blank form at step 414. At step 416, the resource is mapped dynamically to the new resource at run-time by binding the system resource to the saved resource in the snapshot image. If a resource is marked for multiplex (decision step 418), the original resource is duplicated and then spliced among other application instances that share it (step 420). If the resource is a network unique resource (decision step 422), a unique resource must be allocated (step 424) by communicating with another component of the network, i.e. network map or registry, that assigns a resource to this instance. Then this new resource is bound to the fixed resource that was saved in the virtual template (step 426), in a manner similar to virtualization.

C. Virtual Resource ID Mapping

The present invention provides virtual mapping of system resource identifiers in use by a software application for the purpose of making the running state of an application node independent. By adding a layer of indirection between the application and the resource, new system resources are reallocated and then can be mapped to the application's existing resource requirements while it is running, without the application detecting a failure or change in resource handles.

This layer of indirection makes the application's system RID transparent to the application. RID's are usually numeric in form, but can also be alphanumeric. RID's are unique to a machine, and can be reused once all claims to a specific RID have been given up. Some examples of RID's include process ID's, shared memory ID's, and semaphore ID's. Only the virtual RID is visible to the application. Conversely, the virtual RID is transparent to the OS, and only the system RID is visible to the OS. Every application has a unique identifier that distinguishes it from every other running application. There exists a one to one mapping between the AID:resource type:virtual RID combination and the node ID:system RID. Virtual RID's are only required to be unique within their respective applications, along with their corresponding system RID's may be shared among multiple programs and processes that have the same AID. System RID's that have been virtualized are accessed through their virtual ID's to ensure consistent states.

AID's are farm-wide unique resources and are allocated atomically by the AID generator. Because in the present invention applications aren't uniquely bound to specific names, process ID's, machine hostnames or points in time, the AID is the sole, definitive reference to a running application and its processes. Typically, an AID is defined in reference to a logical task that the application is performing or by the logical user that is running the application.

Virtual resource mapping comprises several basic steps: application registration, allocation of the RID, and resolution of the RID. During registration of the application, the AID is derived if preallocated or the application existed previously, or it may be allocated dynamically by an AID generator. The AID is then made known for later use. Allocation of a RID happens when an application requests access to a system resource (new or existing) and the OS returns a handle to a resource in the form of a RID. The virtual resource layer intercepts the system returned RID, allocates a virtual counterpart by calling the resource specific resource allocator, establishes mapping between the two, and returns a new virtual RID to the application.

Resolution of a RID may occur in two different directions. A RID may be passed from the application to the OS, in which case the RID is mapped from virtual ID to system ID. Conversely, the RID may be passed from the OS to the application, in which case the transition is from system ID to virtual ID. Requests for translation are passed from the framework to the virtual RID translation unit and the corresponding mapping is returned once it has been fetched from the appropriate translation table. Multiple translation tables may exist if there are multiple resource types.

Figure 10:
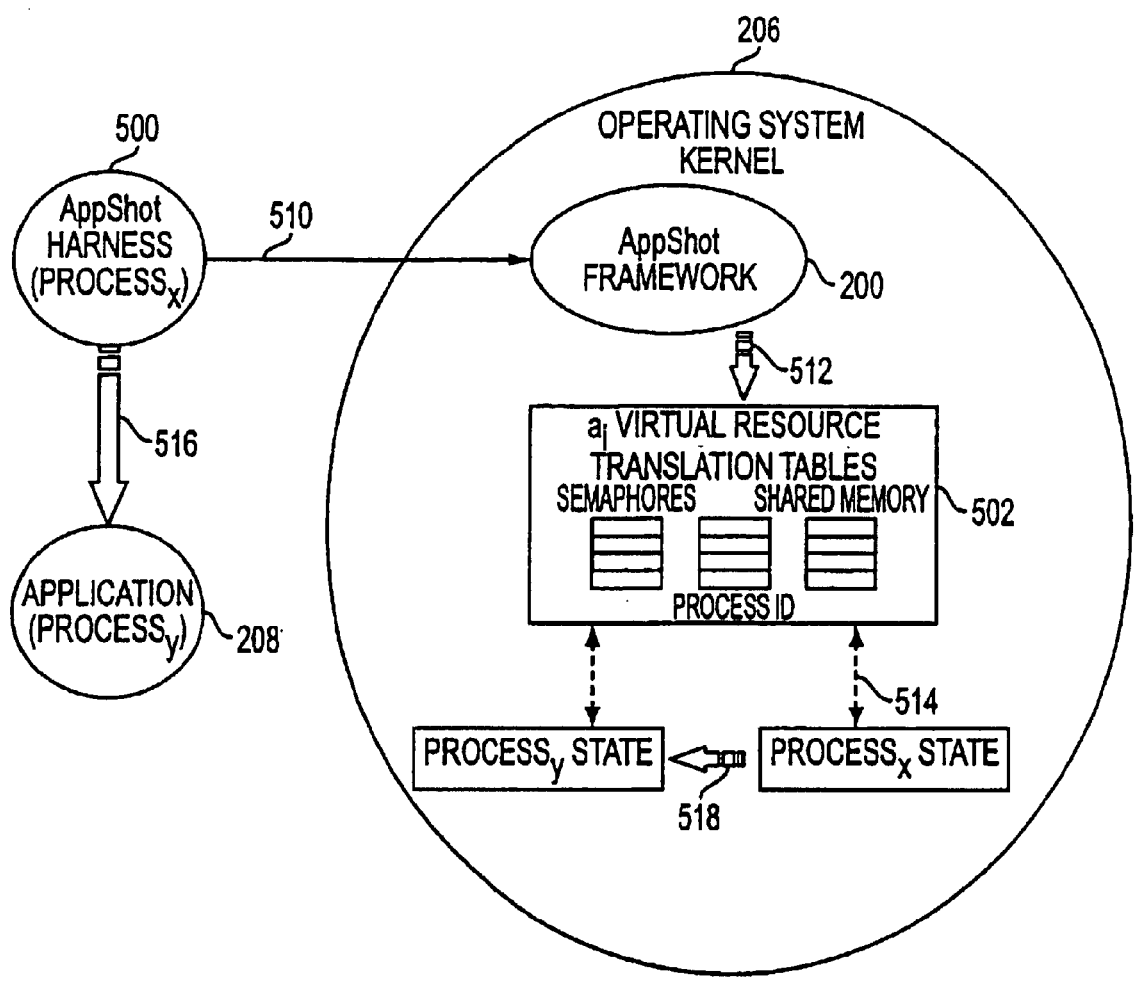
FIG. 10 illustrates the registration of an application using virtual resource identifiers.

FIG. 10 illustrates the steps executed to register an application. The AppShot harness 500 exists to aid in the creation of the appropriate runtime environment for the application prior to launching the application. The appshot harness 500 initializes the runtime environment for an application by first priming its own environment with the appropriate settings and then launching the application which inherits all these settings. The appshot harness 500 is provided because the application cannot be recompiled or rewritten to initialize its own environment. Some of the settings that are established by the appshot harness 500 include the AID, assigned process ID range, DSL specifications, application virtual ID's, and snapshot templating rules. The DSL specifications are registered as part of the environment. A process is an in-memory instantiation of a software program. Process, is the in-memory image of the AppShot harness 500 and process$_y$ is the in-memory image of the application. At step 510, the appshot harness 500 registers an AID $a_i$, such as "dbserver." with the application snapshot/restore framework 200 within the OS kernel 206. The application snapshot/restore framework 200 then creates virtual translation tables 502 for the AID at step 512. Virtual translation tables 502 are data units that contain translation information related to RID's, such as AID's or process ID's, virtual RID's, and system RID's. Separate tables can be implemented per resource type or a table can be shared if a unique resource type is stored per table entry. A translation unit maps the system RID's to the virtual RID's by storing and fetching translation information in the appropriate translation table. Once the virtual translation tables 502 are created, Process$_x$ is linked to the AID a$_i$ at step 514. At this point, process$_y$ is created when the appshot harness 500 launches the application at step 516. Process$_y$ then inherits process$_x$'s link to a$_i$ and its tables at step 518.

Figure 11:
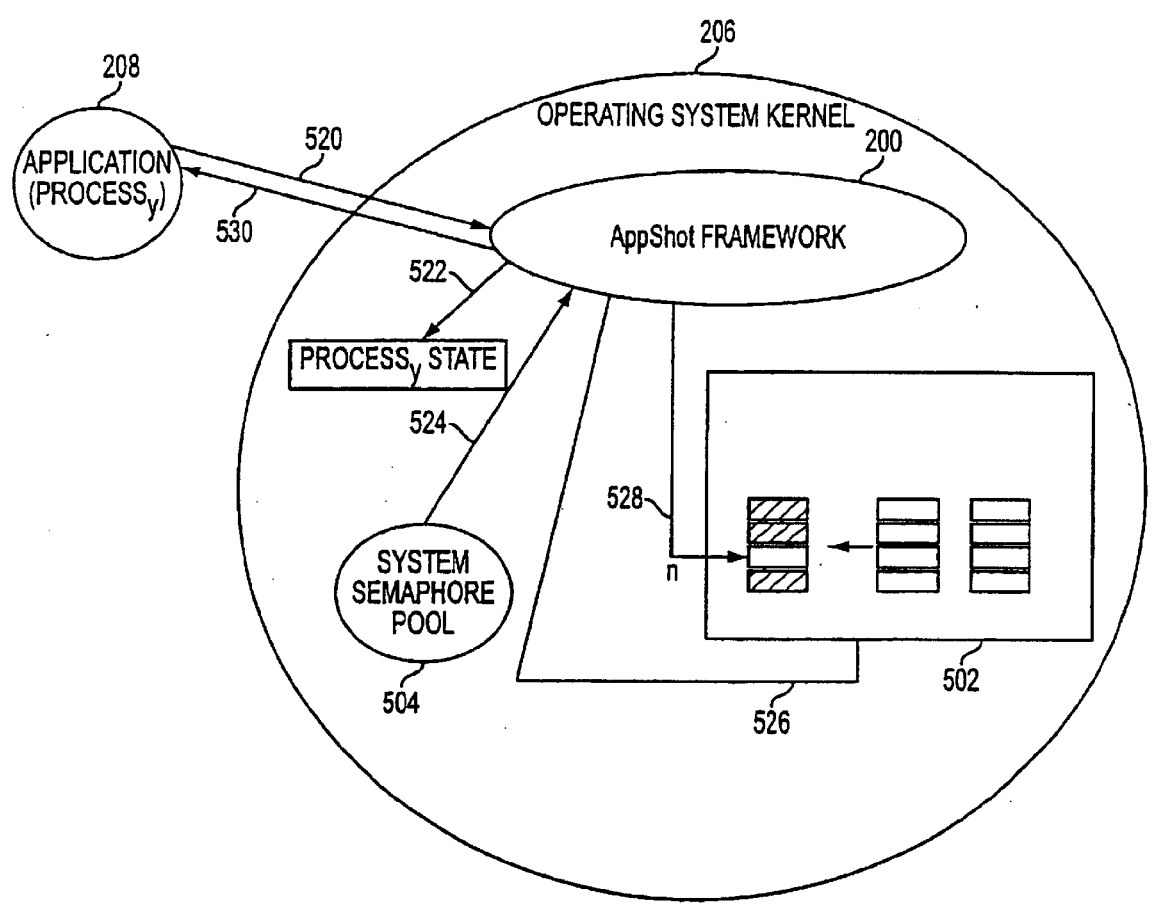
FIG. 11 illustrates the allocation of a virtual resource.

FIG. 11 shows the allocation of a virtual resource such as a semaphore in accordance with the present invention. At step 520, an application requests that a semaphore resource is allocated for its process$_y$. In response (step 522), the application snapshot/restore framework 200 looks up the AID in memory 154, and returns AID a$_i$. At step 524, in response to a request from the application snapshot/restore framework 200, the system semaphore pool returns semaphore s$_i$. At step 526, the application snapshot/restore framework 200 scans the virtual resource translation table 502 for an available slot and allocates the virtual semaphore. At step 528, the application snapshot/restore framework 200 inserts the translation s$_i$=a$_i$:v$_3$ and the virtual resource translation table 502 now contains the mapping. At step 530, the virtual semaphore v$_3$ is returned to the application.

Figure 12:
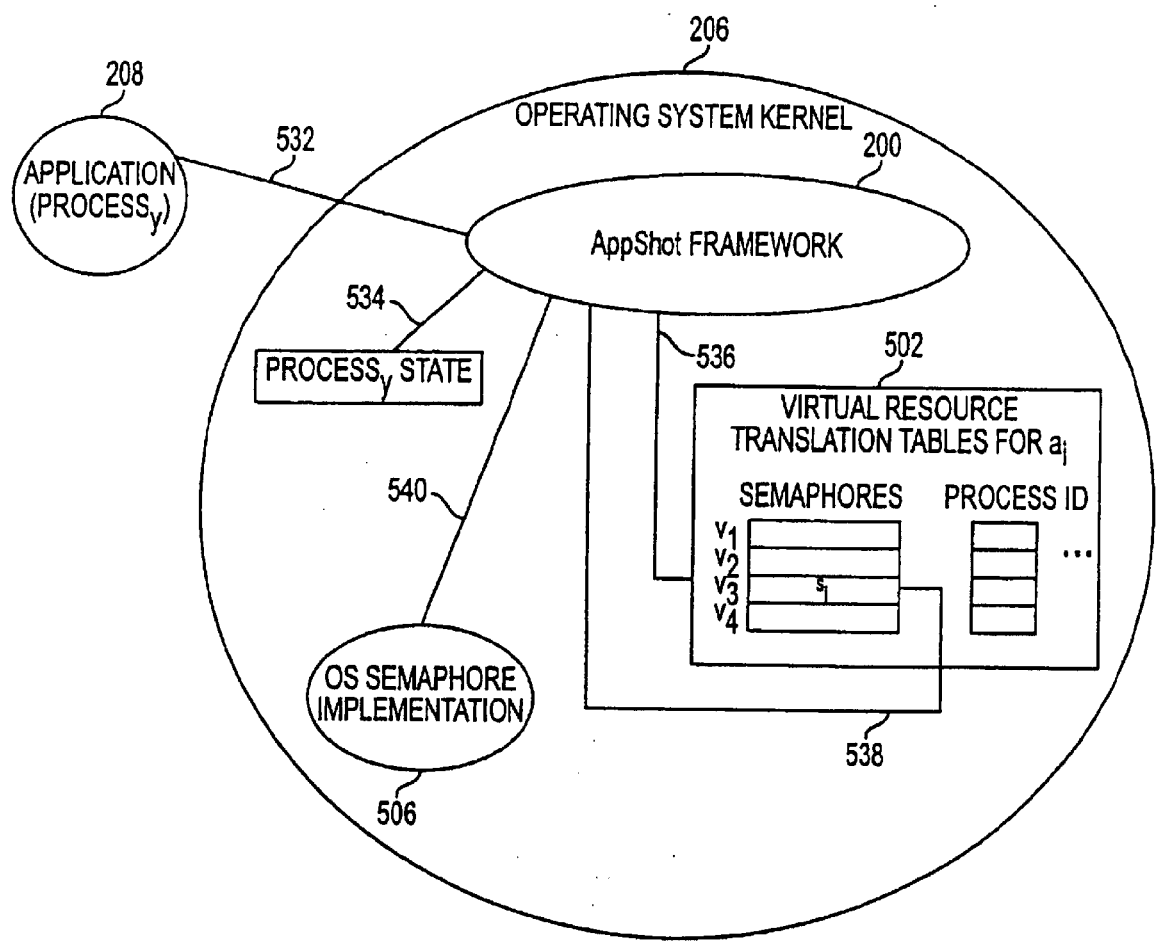
FIG. 12 illustrates the translation of a virtual resource to a system resource.

FIG. 12 illustrations translation of a virtual resource to a system resource in accordance with the present invention. At step 532, the application calls the semaphore interface and supplies the virtual RID v$_3$ to the application snapshot/restore framework 200. At step 534, the application snapshot/restore framework 200 looks up the AID for the calling application and returns a$_i$. At step 536, the application snapshot/restore framework 200 then looks up the translation for a$_i$:v$_3$ in the virtual resource translation table 502, which returns s$_i$ at step 538. At step 540, the OS semaphore implementation is achieved when the application snapshot/restore framework 200 forwards the application's request by substituting s$_i$ for v$_3$.

Figure 13:
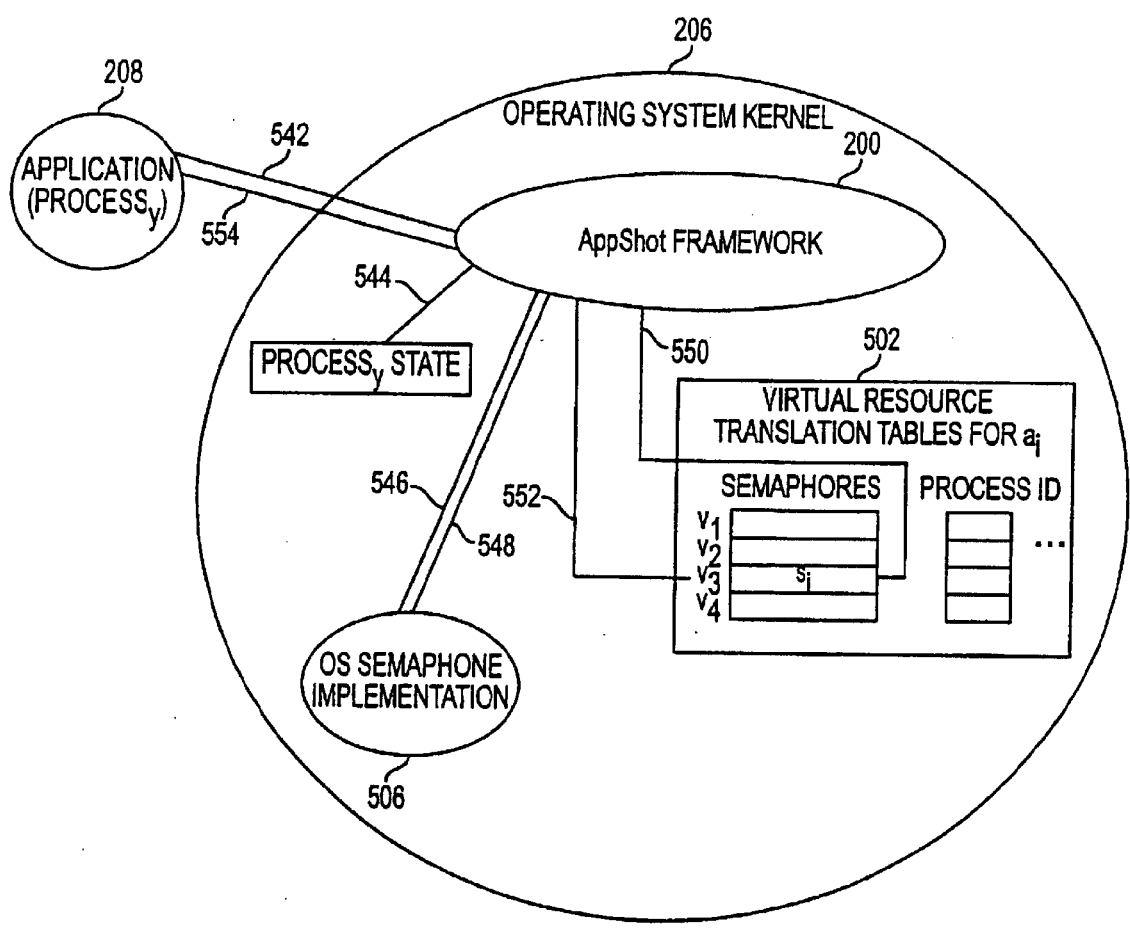
FIG. 13 illustrates the translation of a system resource to a virtual resource.

FIG. 13 illustrates translation of a system resource to a virtual resource. Beginning at step 542, the application calls the semaphore interface and expects the RID as a result. At step 544, the application snapshot/restore framework 200 looks up the AID for the calling application and returns a$_i$. At step 546, the application snapshot/restore framework 200 forwards the application request to the OS semaphore implementation, which returns the system semaphore s$_i$ at step 548. At step 550, the application snapshot/restore framework 200 then looks up the translation for a$_i$:s$_1$ in the virtual resource translation table 502, which returns v$_3$ at step 552. At step 554, the application snapshot/restore framework 200 returns the virtual RID v$_3$ to the calling application.

Figure 14:
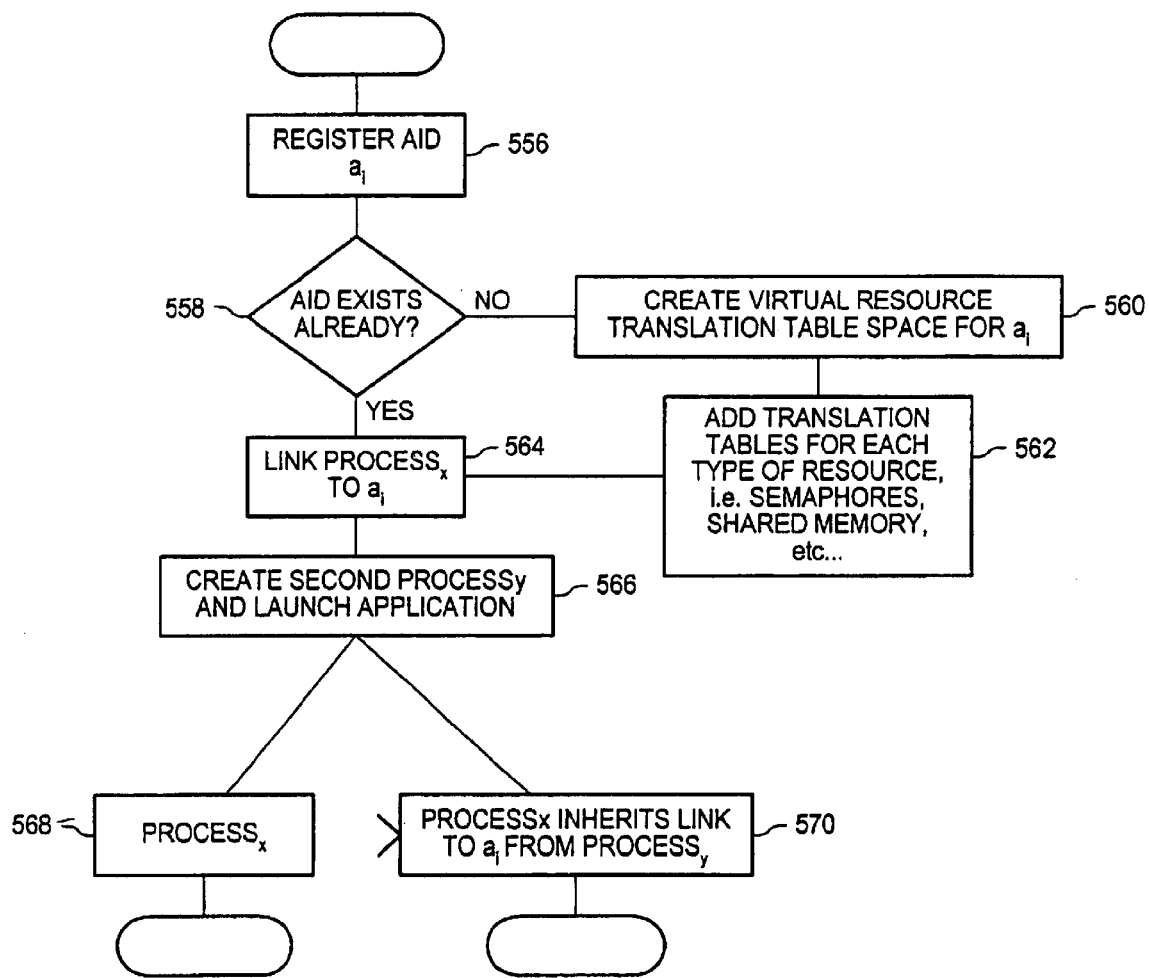
FIG. 14 is a flowchart illustrating the logical sequence of steps executed to create a virtual translation table.

FIG. 14 illustrates the logical sequence of steps executed to create the virtual translation table 502. Beginning at step 556, and attempt is made to register AID a$_i$. If the AID hasn't already been registered (decision step 558), a virtual resource translation table space for a$_i$ is created in table 502 (step 560). Translation tables are then added for each type of resource associated with the application at step 562. At step 564, the process$_x$ is linked to a$_i$. At step 566, the process$_y$ is created and the application is launched. Steps 568 and 570 show the parallel paths of execution. The flow of control continues on to step 568 and halts shortly thereafter. The new flow of execution continues on from 566 to 570, where the process inherits context from the process at step 568.

Figure 15:
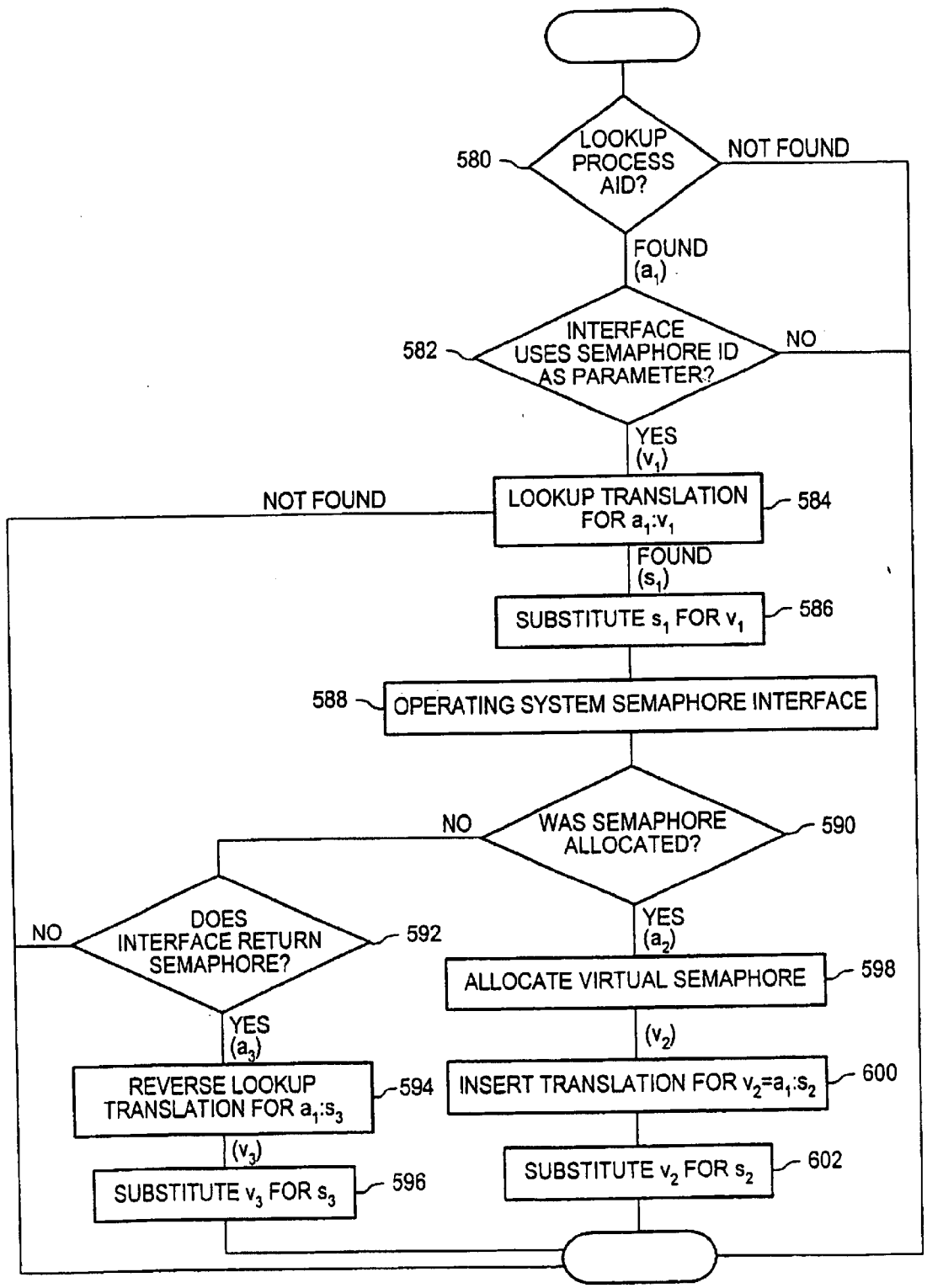
FIG. 15 is a flowchart illustrating the logical sequence of steps executed to translate a virtual resource.

FIG. 15 illustrates in greater detail the sequence of steps executed to translate a virtual resource. For illustrative purposes, the resource in this example is a semaphore. Beginning at decision step 580, if an AID is found upon lookup, and the interface uses the RID as a parameter (decision step 582), the application snapshot/restore framework 200 performs a lookup of the translation for a$_1$:v$_1$ at step 584. If a system resource s$_1$ is found, the system RID is substituted for the virtual RID at step 586 and passed to the semaphore interface of the OS 206 (step 588). If the semaphore was not allocated by the semaphore interface (decision step 590), and the interface returns a semaphore (decision step 592) control proceeds to step 594 where a reverse lookup for the translation of the AID with a system RID is performed. The returned virtual RID is then substituted for the virtual ID at step 596. Returning to decision step 590, if a semaphore was allocated by the semaphore interface, control proceeds to step 598 where the virtual semaphore is allocated and a translation for v$_2$=a$_1$:s$_2$ is inserted into the translation table 502 at step 600. V$_2$ is then substituted for s$_2$ at step 602.

In another aspect, the present invention provides communication between at least two applications through virtual port multiplexing. The communication is achieved by accepting a connection from a second application on a first port and allocating a second port to receive the communication from the second application. Once the second port has been allocated the second port translation is recorded. The communication is sent to the first port from the second application and received on the second port. The communication is then delivered to a first application from the second port. In one embodiment the first application requests the communication from the first port and the first port is translated to determine the second port such that the communication is delivered to the first application in the step of delivering the communication to the first application.

In one embodiment, the communication is received on the first port following the step of sending the data to the first port, the first port is translated to determine the second port prior to the step of receiving the communication on the second port, and the step of receiving the communication on the second port includes queuing the communication on the second port from the first port.

In one embodiment, the second application requests to connect with the first port prior to the step of accepting the connection. Once the second port is allocated, the second port is negotiated including negotiating the second port between a first and second virtual port multiplexer. Further, the second application is connected with the second port following the step of allocating the second port. The step of recording the translation including, first, recording the translation of the second port in association with the first application, and second, recording the translation of the second port in association with the second application.

The present invention also provides for a dynamic symbolic link (DSL) and the resolution of that DSL. The pathname of a first application is renamed to a target pathname, a variable within the target pathname, the first pathname is defined as a symbolic link and the symbolic link is associated with a virtual pathname. The method and apparatus further defines a specification is further defined that is associated with the virtual pathname including associating the variable with the virtual pathname. In associating the symbolic link with the virtual pathname, a declaration is defined within the virtual pathname.

Having disclosed exemplary embodiments and the best mode, modifications and variations may be made to the disclosed embodiments while remaining within the scope of the present invention as defined by the following claims.

What is claimed is:

1. In a computer system, a method for saving a running software application for execution at a later time, the application being associated with a process having a state and an environment, comprising:

associating a unique identifier with the running software application to be saved;

virtualizing the process environment associated with said running software application;

recording process events that change the state of the process, wherein the recording comprises intercepting at least some of the process events generated by the process prior to the process events reaching an operating system on which the application is running;

saving process state in the form of a snapshot image, wherein the process state includes state updated by the process events that were intercepted; and saving shared resource state relevant to said snapshot image with said snapshot image.

2. The method of claim 1, further comprising saving modified memory pages relevant to said snapshot image with said snapshot image.

3. The method of claim 1, further comprising saving states associated multiple threads relevant to said snapshot image.

4. A computer program product, which, when executed by a computer, saves a running software application for execution at a later time, the application being associated with a process having a state and an environment, by:

associating a unique identifier with the running software application to be saved;

virtualizing the process environment associated with said running software application;

recording process events that change the state of the process, wherein the recording comprises intercepting at least some of the process events generated by the process prior to the process events reaching an operating system on which the application is running;

saving process state in the form of a snapshot image, wherein the process state includes state updated by the process events that were intercepted; and saving shared resource state relevant to said snapshot image with said snapshot image.

5. A method comprising:

recording process events that change one or more states of one or more processes associated with a running software application, wherein the recording comprises intercepting at least some of the process events generated by the one or more processes prior to the process events reaching an operating system on which the running software application is running;

saving one or more snapshot images, the one or more snapshot images comprising said one or more process states of said one or more processes, the one or more process states including state updated by the process events that were intercepted; and saving shared resource state used by the application with said snapshot images.

6. The method of claim 5, further comprising associating a unique identifier with said running software application.

7. The method of claim 5, further comprising virtualizing one or more process environments associated with said one or more processes.

8. The method of claim 5, wherein saving said one or more snapshot images comprises saving the difference between the current process state and a prior snapshot.

9. The method of claim 5, further comprising suspending said one or more processes.

10. The method of claim 5 further comprising restoring said software application, wherein said restoring comprises:

restoring said shared resource state; and restoring each of the one or more processes associated with said one or more snapshot images.

11. The method of claim 10 wherein said saving said one or more process states and said saving shared resource state occurs on a first computer system, and wherein said restoring said software application occurs on a second computer system.

12. A system comprising:

an application framework operable to record process events that change one or more states of one or more processes associated with a running software application, wherein the application framework is operable to intercept at least some of the process events generated by the one or more processes prior to the process events reaching an operating system on which the running software application is running, and a snapshot driver operable to:

save one or more snapshot images including said one or more process states of said one or more processes, the one or more process states including state updated by the process events that were intercepted by the application framework; and save shared resource state used by the application with said snapshot images.

13. The system of claim 12, wherein said snapshot driver is further operable to associate a unique identifier with said running software application.

14. The system of claim 12, wherein said snapshot driver is further operable to virtualize one or more process environments associated with said one or more processes.

15. The system of claim 12, wherein said snapshot driver is further operable to save the difference between the current process state and a prior snapshot.

16. The system of claim 12, wherein said snapshot driver is further operable to suspend said one or more processes.

17. The system of claim 12 further comprising a restore driver operable to restore said software application, wherein said restoring comprises:

restoring said shared resource state; and restoring each of the one or more processes associated with said one or more snapshot images.

18. The system of claim 17 wherein said snapshot driver operates on a first computer system, and wherein said restore driver operates on a second computer system.

19. A computer readable medium including program instructions executable to implement a method comprising:

recording process events that change one or more states of one or more processes associated with a running software application, wherein the recording comprises intercepting at least some of the process events generated by the one or more processes prior to the process events reaching an operating system on which the running software application is running;

saving one or more snapshot images, the one or more snapshot images comprising said one or more process states of said one or more processes, the one or more process states including state updated by the process events that were intercepted; and saving shared resource state used by the application with said snapshot images.

20. The computer readable medium of claim 19, wherein the method further comprises associating a unique identifier with said running software application.

21. The computer readable medium of claim 19, wherein the method further comprises virtualizing one or more process environments associated with said one or more processes.

22. The computer readable medium of claim 19, wherein saving said snapshot images comprises saving the difference between the current process state and a prior snapshot.

23. The computer readable medium of claim 19, wherein the method further comprises suspending said one or more processes.

24. The computer readable medium of claim 19 wherein the method further comprises restoring said software application, wherein said restoring comprises:

restoring said shared resource state; and restoring each of the one or more processes associated with said one or more snapshot images.

25. The computer readable medium of claim 19 wherein said saving said one or more process states and said saving shared resource state occurs on a first computer system, and wherein said restoring said software application occurs on a second computer system.

\* \* \* \* \*